United States Patent [19]

Etchu et al.

[11] Patent Number: 5,431,976
[45] Date of Patent: Jul. 11, 1995

[54] LAMINATED POLYESTER FILM AND MAGNETIC RECORDING MEDIUM USING IT AS BASE FILM

[75] Inventors: Masami Etchu, Yokohama; Masahiro Hosoi, Tokyo; Masanori Nishiyama; Yasuhiro Saeki, both of Sagamihara, all of Japan

[73] Assignee: Teijin Limited, Osaka, Japan

[21] Appl. No.: 48,523

[22] Filed: Apr. 20, 1993

[30] Foreign Application Priority Data

Apr. 20, 1992 [JP] Japan .................................. 4-099669
Jun. 15, 1992 [JP] Japan .................................. 4-155014

[51] Int. Cl.$^6$ ........................ B32B 27/06; B32B 27/08; B32B 27/36; G11B 5/704
[52] U.S. Cl. .................................. 428/65.3; 428/213; 428/216; 428/332; 428/337; 428/694 ST; 428/694 SL
[58] Field of Search ............... 428/141, 480, 323, 480, 428/483, 64, 65, 66, 694 ST, 694 SL, 213, 215, 216, 220, 332, 337; 528/302, 305

[56] References Cited

U.S. PATENT DOCUMENTS

| | | | |
|---|---|---|---|
| 3,875,119 | 4/1975 | Aoki et al. ........................ | 260/75 T |
| 4,606,976 | 8/1986 | Hensel et al. ........................ | 428/480 |
| 4,804,736 | 2/1989 | Utsumi et al. ........................ | 528/176 |
| 4,876,137 | 10/1989 | Utsumi et al. ........................ | 428/141 |
| 5,051,292 | 9/1991 | Katoh et al. ........................ | 428/141 |
| 5,069,962 | 12/1991 | Okazaki et al. ........................ | 428/323 |

FOREIGN PATENT DOCUMENTS

| | | |
|---|---|---|
| 0153853 | 9/1985 | European Pat. Off. . |
| 0503443 | 9/1992 | European Pat. Off. . |
| 0504651 | 9/1992 | European Pat. Off. . |

*Primary Examiner*—Paul J. Thibodeau
*Assistant Examiner*—Vivian Chen
*Attorney, Agent, or Firm*—Sherman and Shalloway

[57] ABSTRACT

A laminated polyester film for use in a magnetic recording medium, which comprises (A) a first layer of a first polyester which contains at least 95 mol %, based on the total content of its dicarboxylic acid components, of a 2,6-naphthalenedicarboxylic acid component and whose main recurring unit is composed of ethylene-2,6-naphthalenedicarboxylate, and (B) a second layer of a second polyester containing 93 to 99 mol %, based on the total content of its recurring units, of an ethylene-2,6-naphthalenedicarboxylate recurring unit. The second layer is laminated on at least one surface of two surfaces of the above first layer.

25 Claims, No Drawings

LAMINATED POLYESTER FILM AND MAGNETIC RECORDING MEDIUM USING IT AS BASE FILM

DETAILED DESCRIPTION OF THE INVENTION

The present invention relates to a laminated polyester film for use in a magnetic recording medium and a magnetic recording medium using the same as a base film. More specifically, it relates to a laminated polyester film formed of a first layer of a first polyester comprising an ethylene-2,6-naphthalenedicarboxylate as a main recurring unit and a second layer of a second polyester different from the first polyester, and a magnetic recording medium using the above laminated polyester film as a base film.

In a conventional magnetic recording medium, a biaxially oriented polyethyleneterephthalate film is used as a base film. However, the problems with this base film of biaxially oriented polyethylene-terephthalate are that its coercive force is small and that the running performance and durability of a magnetic recording tape using it deteriorate when the thickness of the tape is decreased in order to increase the length of the tape to be encased in a cassette for recording and reproducing for a longer period of time. For overcoming the above problems, it has been therefore proposed to use a biaxially oriented polyethylene-2,6-naphthalenedicarboxylate film having a high Young's modulus as a base film for a magnetic recording tape.

However, even in a magnetic recording tape using a biaxially oriented polyethylene-2,6-naphthalenedicarboxylate film having a high Young's modulus and a low heat shrinkage percentage, it is also required to decrease the tape thickness for recording and reproducing for a longer period of time, and it is further required to increase the molecular orientation of the film by stretching it for improving its Young's modulus. These requirements clearly involve some problems.

For example, with an increase in the orientation degree, voids are liable to be formed between inert fine particles contained as a lubricant and a polymer. At the same time, the lubricant particles are liable to drop off from the film surface, and the particles which have dropped are liable to cause dust (foreign matter). Some of the dust particles adhere to the film surface and some of the dust particles are taken into a coated web or a tape at a step of processing the film into a magnetic tape to deteriorate the magnetic conversion characteristics. It is increasingly desired to overcome the above problem as the recording density of the magnetic recording medium is increased.

It is an object of the present invention to provide a laminated polyester film for use in a magnetic recording medium.

It is another object of the present invention to provide a laminated polyester film for use in a magnetic recording, which causes almost no abrasion on the film surface or hardly causes foreign matter to drop off from the film surface in steps of processing the film into a magnetic recording medium, particularly in a step for coating a magnetic layer solution by means of a die coater and in a step of calendering treatment after the film is coated with a magnetic layer.

It is further another object of the present invention to provide a magnetic recording medium using the above laminated polyester film of the present invention as a base film.

Other objects and advantages of the present invention will be apparent from the following description.

According to the present invention, the above objects and advantages of the present invention will be achieved, first, by a laminated polyester film for use in a magnetic recording medium, which comprises:

(A) a first layer of a first polyester which contains at least 95 mol %, based on the total content of its dicarboxylic acid components, of a 2,6-naphthalenedicarboxylic acid component and whose main recurring unit is composed of ethylene-2,6-naphthalenedicarboxylate, and (B) a second layer of a second polyester containing 93 to 99 mol %, based on the total content of its recurring units, of an ethylene-2,6-naphthalenedicarboxylate recurring unit, the second layer being laminated on at least one surface of two surfaces of the above first layer.

In the first polyester forming the first layer of the laminated polyester film of the present invention, the dicarboxylic acid component to form the first polyester contains at least 95 mol % of a 2,6-naphthalenedicarboxylic acid component, and the main recurring unit of the first polyester is composed of ethylene-2,6-naphthalenedicarboxylate.

The "other dicarboxylic acid component" contained in an amount of less than 5 mol % as a dicarboxylic acid component other than the 2,6-naphthalenedicarboxylic acid includes aromatic dicarboxylic acids such as terephthalic acid, isophthalic acid, 2,7-naphthalenedicarboxylic acid, diphenylsulfonedicarboxylic acid, 4,4'-diphenyldicarboxylic acid and benzophenonedicarboxylic acid; aliphatic dicarboxylic acids such as succinic acid, adipic acid, sebacic acid and dodecanedicarboxylic acid; and alicyclic dicarboxylic acids such as hexahydroterephthalic acid and 1,3-adamantanedicarboxylic acid.

As far as the first polyester contains ethylene-2,6-naphthalenedicarboxylate as a main recurring unit, preferably 94 to 97 mol % of an ethylene-2,6-naphthalenedicarboxylate recurring unit based on the total recurring unit content, the diol component to form the first polyester may partially contain other diol components such as 1,3-propanediol, 1,4-butanediol, 1,6-hexanediol, neopentyl glycol, 1,4-cyclohexanedimethanol, an ethylene oxide adduct of 2,2-bis(4-hydroxyphenyl)propane and p-xylylene glycol.

As the first polyester, for example, preferred is a homopolymer of ethylene-2,6-naphthalenedicarboxylate.

The second polyester forming the second layer of the laminated polyester film of the present invention contains 93 to 99 mol % of ethylene-2,6-naphthalenedicarboxylate based on the total content of its recurring units.

A recurring unit other than the ethylene-2,6-naphthalenedicarboxylate recurring unit is contained in an amount of 1 to 7 mol %.

The above "other recurring unit" may be formed from the above "other dicarboxylic acid components" and "other diol components" described regarding the first polyester. And it is preferred that the "other recurring unit" be formed from at least one component selected from 4,4'-diphenyldicarboxylic acid, 2,7-naphthalenedicarboxylic acid and an ethylene oxide adduct of 2,2-bis(4-hydroxyphenyl)propane.

The ethylene oxide adduct of 2,2-bis(4-hydroxyphenyl)propane preferably is represented by the following formula,

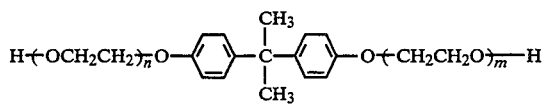

wherein each of n and m is independently a number of from 1 to 9, provided that n+m equals 2 to 10, preferably about 4.

In the second polyester, the content of the ethylene-2,6-naphthalenedicarboxylate recurring unit based on the total recurring unit content is 93 to 99 mol %, preferably 94 to 97 mol %.

The above first polyester and second polyester may contain additives such as a stabilizer, a colorant, an antistatic agent and a lubricant as required. In particular, it is preferred to incorporate inert solid fine particles as a lubricant in order to roughen the film surface for improving the film lubricity.

As the above inert solid particles, preferred are (1) silicon dioxide (including its hydrate, quartz sand and quartz); (2) alumina; (3) silicates having an $SiO_2$ content of at least 30% by weight, e.g., amorphous or crystalline clay minerals, aluminosilicate (including calcined aluminosllicate and its hydrate), chrysotile and fly ash; (4) oxides of Mg, Zn, Zr and Ti; (5) sulfates of Ca and Ba; (6) phosphates of Li, Na and Ca; (7) benzoates of Li, Na and K; (8) terephthalates of Ca, Ba, Zn and Mn; (9) titanates of Mg, Ca, Ba, Zn, Cd, Pb, St, Mn, Fe, Co and Ni; (10) chromates of Ba and Pb; (11) carbon (e.g., carbon black and graphite); (12) glass (e.g., glass powder and glass beads); (13) carbonates of Ca and Mg; (14) fluorite; and (15) ZnS. More preferred are silicon dioxide, silicic anhydride, hydrous silicic acid, aluminum oxide, aluminum silicate (including calcined aluminum silicate and its hydrate), monolithium phosphate, trilithium phosphate, sodium phosphate, calcium phosphate, barium sulfate, titanium oxide, lithium benzoate, double salts of these compounds (including their hydrates), a glass powder, clay (including kaolin, bentonite and terra abla), talc and calcium carbonate. Particularly preferred are silicon dioxide, titanium oxide and calcium carbonate. The above additives may be used in combination. In this case, the additives having different average particle diameters may be used in equal amounts or in different amounts. The average particle diameter of the additives is preferably 0.05 to 0.8 $\mu$m, and the amount of the additives is preferably 0.01 to 0.5% by weight.

The first polyester and the second polyester are both produced by any one of known polymerization methods, preferably by a melt polymerization method.

For example, polyethylene-2,6-naphthalenedicarboxylate can be produced by a method in which 2,6-naphthalenedicarboxylic acid and ethylene glycol are allowed to react in an esterification reaction, or dimethyl-2,6-naphthalenedicarboxylate and ethylene glycol are allowed to react in an ester interchange reaction, and the reaction product is allowed to react in a polycondensation reaction under reduced pressure to form a polymer having a desired polymerization degree. Further, a copolyester can be produced in the same manner as in the method of producing the polyethylene-2,6-naphthalenedicarboxylate except that a third component such as 2,7-naphthalenedicarboxylic acid is additionally used in a predetermined amount. In the above polycondensation reaction, it is preferred to use a catalyst, and other additives may be added.

The first polyester and the second polyester preferably have an intrinsic viscosity of 0.45 to 0.90.

The laminated polyester film of the present invention comprises a first layer of the first polyester and a second layer of the second polyester, the second layer being laminated on at least one surface of two surfaces of the first layer. That is, the laminated polyester film of the present invention includes a laminate film formed of a first layer of the first polyester and two second layers of the second polyester sandwiching the first layer, and a laminated film formed of a first layer of the first polyester and one second layer of the second polyester laminated on only one surface of the first layer.

In the laminated polyester film of the present invention, the film thickness ratio between the first layer and the second layer may be almost freely set, while the thickness of the second layer should not be too small, nor should it be too large. Otherwise, the second layer fails to exhibit its full properties. When the thickness of the second layer is too large, the laminated polyester film is liable to show a decreased Young's modulus and decreased dimensional stability against heat. When this thickness is too small, it is liable to difficult to control the film surface properties and the uniformity in film thickness. Although, the film thickness ratio as preferred ones differs depending upon the total thickness of the laminated polyester film, the total thickness of the laminated polyester film may be in the range of from 3 to 80 $\mu$m.

The laminated polyester film of the present invention may be in the form of a tape for forming a magnetic recording tape and in the form of a disc for forming a flexible disc.

When the laminated polyester film is in the form of a tape, the total thickness of the laminated polyester film is preferably 3 to 12 $\mu$m, and in this case, preferably, the thickness of the second layer is at least 0.1 $\mu$m and does not exceed ½ of the total thickness of the laminated polyester film.

When the laminated polyester film is in the form of a disc, the total thickness of the laminated polyester film is preferably 30 to 80 $\mu$m, and in this case, the thickness of the second layer is preferably 0.2 to 10 $\mu$m, more preferably 0.2 to 5 $\mu$m.

The second polyester forming the second layer generally preferably contains inert solid fine particles as a lubricant. In setting the above film thickness ratio, it is preferred to consider the kind, average particle diameter and concentration of the solid fine particles and the film surface roughness.

When the laminated polyester film of the present invention is used as a base for forming a magnetic recording tape, its Young's modulus in at least one direction of its longitudinal and transverse directions is preferably at least 650 kg/mm$^2$, more preferably at least 700 kg/mm$^2$. When the laminated polyester film of the present invention is used as a base for forming a magnetic recording flexible disc, its Young's modulus in freely selected one direction is preferably at least 500 kg/mm$^2$, more preferably at least 550 kg/mm$^2$, particularly preferably at least 600 kg/mm$^2$.

The laminated polyester film of the present invention can be produced by any one of known methods of forming laminated films. Particularly preferably, it is produced by a method in which a laminated unstretched film is prepared by a co-extrusion method and then biaxially stretched. In the co-extrusion method, generally, the first polyester and the second polyester are separately melted in different extruders and laminated in a co-extrusion die. Further, the laminated polyester film can be formed by means of a feed block die or a multi-manifold die. The biaxially stretching may be carried out by a consecutive biaxial stretching method or by a simultaneous biaxial stretching method. The former is generally employed.

In the consecutive biaxial stretching method, the stretching at a first stage is carried out at a temperature higher than the glass transition temperature (Tg) of the polyesters, preferably at a temperature between (TK+3) and (Tg+50)°C., and the stretching at a second stage is carried out at a temperature of between the temperature used for the stretching at the first stage and a temperature 20° C. higher than the temperature used for the stretching at the first stage. The stretch ratio in one direction is preferably at least 2, more preferably at least 2.5, and the area ratio is preferably at least 6, more preferably 9. The heat treatment (heat set) is preferably carried out at 170° C. or higher, more preferably 190° C. or higher, under tension. Differing depending upon the time to be taken for the heat treatment, the upper limit of the temperature for the heat treatment is naturally a temperature at which the film takes a stabilized shape. The time for the heat treatment is preferably several to tens in the unit of second, more preferably 3 to 30 seconds.

For producing the laminated polyester film having higher strength (higher Young's modulus), it is preferred to employ a so-called three-stage stretching or four-stage stretching method in which the above unstretched film is first stretched at 130° to 170° C. in the longitudinal direction at a stretch ratio of 2.0 to 3.0, then stretched at 130° to 160° C. in the transverse direction at a stretch ratio of 3.5 to 4.5 and then stretched at 130° to 170° C. in the longitudinal direction and/or transverse direction at a stretch ratio of 1.5 to 2.5.

The laminated polyester film of the present invention may have a magnetic layer on one surface, or may have a magnetic layer on one surface and a magnetic layer on the other surface.

According to the present invention, therefore, there is provided a magnetic recording medium comprising the above laminated polyester film as a base film and a magnetic layer, the laminated polyester film comprising a first layer and two second layers, one of the second layers being laminated on one surface of the first layer and the other second layer being laminated on the other surface, and the magnetic layer being present on the surface of at least one of the above two second layers (to be referred to as "first magnetic recording medium" hereinafter), and there is also provided a magnetic recording medium comprising the above laminated polyester film as a base film and a magnetic layer, the laminated polyester film comprising a first layer and a 'second layer laminated on only one surface of the first layer, the magnetic layer being present on the other surface (not laminated with the second layer) of the first layer (to be referred to as "second magnetic recording medium" hereinafter).

The magnetic layer is known per se, and the method of forming the magnetic layer on the laminated polyester film is also known per se. In the present invention, any known magnetic layers and any known methods may be employed.

For example, for forming the magnetic layer on the laminated polyester film by applying a magnetic coating composition, the ferromagnetic powder for use in the magnetic layer can be selected from known ferromagnetic materials such as $\gamma Fe_2O_3$, $\gamma$-$Fe_3O_4$ containing Co, $Fe_3O_4$ coated with Co, $CrO_2$ and barium ferrite.

The binder used together with the magnetic powder can be selected from known thermoplastic resins, thermosetting resins, reactive resins and mixtures of these. Specific examples of these resins include a vinyl chloride-vinyl acetate copolymer and polyurethane elastomer.

The magnetic coating composition may further contain an abrasive (e.g., $\alpha$-$Al_2O_3$), an electrically conductive agent (e.g., carbon black), a dispersant (e.g., lecithin), a lubricant (e.g., n-butylstearate or lecithin), a curing agent (e.g., an epoxy resin) and a solvent (e.g., methyl ethyl ketone, methyl isobutyl ketone or toluene).

When the magnetic layer is formed on the laminated polyester film of the present invention by applying the magnetic coating composition, for example, by means of a die coater, the film surface to be coated by means of the die coater frictionally contacts the lower surface of the die coater. In the present invention, however, the magnetic coating composition can be applied by means of a die coater without any problem, since the film surface of the second layer has high abrasion resistance.

When the magnetic layer is formed on the laminated polyester film of the present invention by applying the magnetic coating composition, for example, by means of a reverse coater, the film surface to be coated with the magnetic coating composition is not so strongly brought into frictional contact as in the case of coating by means of a die coater. Therefore, even when the laminated polyester film comprises the second layer being present on only one film surface of the first layer, the magnetic coating composition can be applied to the other film surface of the first layer of the laminated polyester film.

Further, the film coated with the magnetic layer is generally subjected to calendering treatment to compress the magnetic layer of the film. In this case, the other side of the film, i.e., the film surface not coated with the magnetic layer, comes in contact with rollers, and therefore, the abrasion resistance of the other side of the film is important. The laminated polyester film comprising one second layer on one surface of the first layer and other second layer on the other surface, provided by the present invention, can be subjected to calendering treatment without any problem, since the film surface to come in contact with rollers is the surface of the second layer having high abrasion resistance when the magnetic layer is formed on the other second layer.

Further, the laminated polyester film comprising the second layer on only one surface of the first layer, provided by the present invention, can be also subjected to calendering treatment without any problem, since the magnetic layer is formed on the other surface (not laminated with the second layer) of the first layer and the film surface to come in contact with rollers is the surface of the second layer having high abrasion resistance.

The magnetic layer can be also preferably formed by any one of known methods such as a vacuum vapor deposition method, a sputtering method and an ion plating method.

Further, when the magnetic layer is formed on only one surface of the base film, a coating of an organic polymer containing a lubricant may be formed on the other surface (not coated with the magnetic layer) of the base film for maintaining running properties as a tape.

The laminated polyester film for use in a magnetic recording medium, provided by the present invention, hardly causes foreign matter such as white dust, etc., in processing. And, the magnetic recording medium using the above laminated polyester film of the present invention as a base is excellent in electromagnetic conversion characteristics and running durability, and is useful as a high-density magnetic recording tape, particularly as a metal tape, and it is also useful as a high-density magnetic recording disc.

The present invention will be explained in more detail hereinafter by reference to Examples. The methods of measurements and evaluations described therein are as follows.

(1) Young's Modulus

A film was cut to prepare a sample having a width of 10 mm and a length of 15 cm, and the sample was tensed with an instron type-universal tensile tester at an inter-chuck distance of 100 mm, at a tension rate of 10 mm/minute, at a chart rate of 500 mm/minute and at room temperature to prepare a load-elongation curve, and the Young's modulus was calculated on the basis of a tangent on the rising part of the load-elongation curve.

(2) Surface Roughness (Ra) of Film

A chart (surface roughness curve of a film) was drawn by means of a probe-method surface roughness tester (Surfcoder 30C, supplied by Kosaka Kenkyusho) with a probe having a radius of 2 $\mu$m under a probe pressure of 30 mg. A portion having a measured length L in the direction of its center line was picked up from the surface roughness curve of a film. The center line of this portion picked up was regarded as an X axis, the direction of the longitudinal magnification was regarded as a Y axis, and the roughness curve was expressed as Y=f(x). The value (Ra; $\mu$m) given by the following equation was defined as the surface roughness of the film.

$$Ra = \frac{1}{L} \int_0^L |f(x)| dx$$

In the present invention, the measured length was 1.25 mm, the cut off value was 0.08 mm, and the measurement was conducted five times. The average of the values obtained by the five measurement was taken as Ra.

(3) Heat Shrinkage Percentage

A film having a length of about 30 cm and a width of 1 cm, which had been exactly measured for a length, was placed in an oven set at 70° C. under no load, and heat-treated for 1 hour. Then, the film was taken out of the oven, allowed to cool to room temperature and measured for a difference in length. The heat shrinkage percentage was determined on the basis of the following equation, $$\text{Heat shrinkage percentage} = \frac{\Delta L}{L_0} \times 100$$

wherein $L_0$ is a length before the heat treatment and $\Delta L$ is a difference in length caused due to the heat treatment.

(4) Abrasion Resistance

A film was slit to prepare a tape having a width of ½ inch, and the tape was allowed to run 50 m with a single edge being vertically pressed on the tape so that the tape was sunk 1.5 mm deep (running tension: 60 g, running rate: 1 m/second). The abrasion resistance of the tape was evaluated in terms of a width of an abrasion dust of the film adhering the single edge.

(5) Electromagnetic Conversion Characteristics

A magnetic tape for video was measured for an S/N ratio with a noise meter supplied by Shibasoku K.K. Further, a difference between the above S/N ratio and the S/N ratio of the tape of Comparative Example 1 shown in Table 1 was determined. The VTR used for this measurement was EV-S700, supplied by Sony Co. Ltd.

(6) Running Durability of Magnetic Tape

While the running of a magnetic tape with a VTR (EV-S700, supplied by Sony Co. Ltd.) was started and stopped repeatedly, the magnetic tape was allowed to run for 100 hours, examined on a running state and measured for an output. The magnetic tape was evaluated on its running durability as follows. Tapes which satisfied all the following items were taken as excellent, and tapes which failed to satisfy any one of them was taken as defective.

(i): A tape edge neither bends nor forms a wavy or crinkly shape.
(ii): A tape makes no running noise.
(iii): A tape does not tear or break.

(7) Skew

A video tape used for recording at an ordinary temperature (20° C.) at an ordinary humidity was heat-treated at 70° C. for 1 hour, and the tape was played back at an ordinary temperature at an ordinary humidity. And, a deviation amount was read at a head switching point.

(8) Drop-out

Drop-outs of 5 $\mu$sec×10 dB were counted with a commercially available drop-out counter (e.g., Shibasoku VH01BZ type), and the number of counts for 1 minute was determined.

(9) Area Ratio of Voids

The surface of a film was ion-etched to expose lubricants particles contained in the film, and aluminum was uniformly vapor-deposited to form a coating having a thickness of 400 to 500 angstroms or less. While the coated surface was observed through a scanning electron microscope at a magnification of 3,500 to 5,000 times, voids around the lubricant particles were measured for an area with an image analyzing apparatus "Luzex". This area was divided by the area of the lubricant particles determined in the same manner to determine the area ratio of voids. The ion-etching was carried out, e.g., by ion-etching the film surface with an ion etching apparatus, JFC-1100 supplied by Japan Optical Electric Laboratory (JOEL) Ltd at 500 V at 12.5 mA for 15 minutes. The vacuum degree was around $10^{-3}$ Torr. The area measurement was effected on lubricant particles having a size of about 0.3 $\mu$m or larger.

EXAMPLES 1–3 AND COMPARATIVE EXAMPLES 1 AND 2

(1) A polyethylene-2,6-naphthalenedicarboxylate containing 0.2% by weight of fine silica particles having an average particle diameter of 0.1 μm and a polyethylene-2,6-naphthalenedicarboxylate containing 0.13% by weight of fine silica particles having an average particle diameter of 0.3 μm were prepared by a conventional method. These polyethylene-2,6-naphthalenedicarboxylates had an intrinsic viscosity of 0.63 dl/g.

Further, polyethylene-2,6-naphthalenedicarboxylate copolymers containing 0.13% by weight of fine silica particles having an average particle diameter of 0.3 μm and containing a 2,7-naphthalenedicarboxylic acid component in amounts shown in Table 1 were prepared by a conventional method. These copolymers had an intrinsic viscosity of 0.63 dl/g.

The above polyethylene-2,6-naphthalenedicarboxylates (PEN-2,6) or one of the above polyethylene-2,6-naphthalenedicarboxylates and one of the above polyethylene-2,6-naphthalenedicarboxylate copolymers (PEN-2,6 copolymers) were dried, melted in different melt-extrusion apparatus, converged in an extrusion die having a two-layered structure, extruded and cooled to give an unstretched laminated sheet.

The above unstretched laminated sheet was stretched in the longitudinal direction at a stretch ratio of 4.85 through two rolls having different rotation rates at a temperature of 130° C., further stretched in the transverse direction at a stretch ratio of 5.15 with a tenter at 130° C., and then heat-treated at 215° C. for 10 seconds.

In the above manner, biaxially oriented laminated polyester films having a thickness of 5.4 μm were prepared, and taken up. Table 1 shows the properties of these films.

TABLE 1

| | Polymer | Thickness (μm) | Fine silica particles (1) size (2) concentration | Surface roughness (nm) |
|---|---|---|---|---|
| Comp. Ex. 1 | PEN-2,6 | 5.2 | (1) 0.1 μm (2) 0.2 wt % | 5 |
| | PEN-2,6 | 0.2 | (1) 0.3 μm (2) 0.13 wt % | 7 |
| Ex. 1 | PEN-2,6 | 5.2 | (1) 0.1 μm (2) 0.2 wt % | 5 |
| | PEN-2,6-copolymer (2,7-naphthalene-dicarboxylic acid component 2 mol %) | 0.2 | (1) 0.3 μm (2) 0.13 wt % | 7 |
| Ex. 2 | PEN-2,6 | 5.2 | (1) 0.1 μm (2) 0.2 wt % | 5 |
| | PEN-2,6-copolymer (2,7-naphthalene-dicarboxylic acid component 5 mol %) | 0.2 | (1) 0.3 μm (2) 0.13 wt % | 7 |
| Ex. 3 | PEN-2,6 | 5.2 | (1) 0.1 μm (2) 0.2 wt % | 5 |
| | PEN-2,6-copolymer (2,7-naphthalene-dicarboxylic acid component 7 mol %) | 0.2 | (1) 0.3 μm (2) 0.13 wt % | 7 |
| Comp. Ex. 2 | PEN-2,6 | 5.2 | (1) 0.1 μm (2) 0.2 wt % | 5 |
| | PEN-2,6-copolymer (2,7-naphthalene-dicarboxylic acid component 10 mol %) | 0.2 | (1) 0.3 μm (2) 0.13 wt % | 7 |

| | Young's modulus (MD/TD) (kg/mm$^2$) | Heat shrinkage (MD/TD) (%) | Abrasion resistance width of adhering white dust (mm) | Electromagnetic conversion characteristics Y-S/N (dB) | Running durability | Skew (μsec) | Drop-out (counts/min.) |
|---|---|---|---|---|---|---|---|
| Comp. Ex. 1 | 710/730 | 0.06/0.09 | 1.1 | 0 | excellent | 7 | 15 |
| Ex. 1 | 700/730 | 0.06/0.08 | 0.7 | 0 | excellent | 7 | 8 |
| Ex. 2 | 700/730 | 0.06/0.08 | 0.7 | 0 | excellent | 7 | 7 |
| Ex. 3 | 690/720 | 0.06/0.08 | 0.5 | 0 | excellent | 7 | 7 |
| Comp. Ex. 2 | 680/700 | 0.07/0.07 | 0.4 | 0 | poor | 8 | 5 |

(2) Separately, a magnetic coating composition was prepared by placing the following composition in a ball mill, kneading/dispersing it for 16 hours, adding 5 parts by weight of an isocyanate compound (Desmodur L, supplied by Bayer AG), and dispersing the resultant mixture under shear of a high velocity for 1 hour.

| Composition of magnetic coating composition | |
|---|---|
| | Part by weight |
| Acicular Fe particles | 100 |
| Vinyl chloride-vinyl acetate | |

-continued

| Composition of magnetic coating composition | |
|---|---|
| | Part by weight |
| copolymer (S-Lec 7A, supplied by Sekisui Chemical Co., Ltd.) | 15 |
| Thermoplastic polyurethane resin | 5 |
| Chromium oxide | 5 |
| Carbon black | 5 |
| Lecithin | 2 |
| Fatty acid ester | 1 |
| Toluene | 50 |
| Methyl ethyl ketone | 50 |
| Cyclohexanone | 50 |

The above-prepared magnetic coating composition was applied to the polyethylene-2,6-naphthalenedicarboxylate film surface of each of the above biaxially oriented laminated polyester films with a die coater such that the coatings had a thickness of 3 μm, and the coatings were orientation-treated in a direct current magnetic field at 2,500 Gauss and dried under heat at 100° C. Then, the films were subjected to super calendering treatment (linear pressure 200 kg/cm, temperature 80° C.), and then taken up. The so-obtained rolls were allowed to stand in an oven at 55° C. for 3 days.

A back-coating composition having the following composition was applied to the polyethylene-2,6-naphthalenedicarboxylate copolymer surface (running surface) of each of the above biaxially oriented laminated polyester films such that the coating had a thickness of 1 μm, and dried. The resultant films were cut to a width of ½ inch to give magnetic tapes.

| Composition of back coating composition | |
|---|---|
| | Part by weight |
| Carbon black | 100 |
| Thermoplastic polyurethane resin | 60 |
| Isocyanate compound (Colonate L, supplied by Nippon Polyurethane Kogyo K.K.) | 18 |
| Silicone oil | 0.5 |
| Methyl ethyl ketone | 250 |
| Toluene | 50 |

Table 1 shows the properties of the above-obtained films and tapes.

Table 1 clearly shows that the magnetic tapes obtained in Examples 1 to 3 were excellent in all of dropout, electromagnetic conversion characteristics, running durability and skew.

EXAMPLE 4

A polyethylene-2,6-naphthalenedicarboxylate (PEN-2,6) substantially not containing fine lubricant particles was prepared by a conventional method. Further, a polyethylene-2,6-naphthalenedicarboxylate copolymer (PEN-2,6 copolymer) containing 0.15% by weight of fine silica particles having an average particle diameter of 0.3 μm and containing 3 mol % of a 2,7-naphthalenedicarboxylic acid component was prepared by a conventional method. These polymers had an intrinsic viscosity of 0.65 dl/g.

The above PEN-2,6 and PEN-2,6 copolymer were dried, melted in different melt-extrusion apparatus, converged in an extrusion die having a three-layered structure so as to form a core layer of the PEN-2,6 and two surface layers of the PEN-2,6 copolymer, extruded and rapidly cooled to give an unstretched laminated sheet.

The above unstretched laminated sheet was stretched in the longitudinal direction at a stretch ratio of 3.6 at 150° C., further stretched in the transverse direction at a stretch ratio of 3.7 at 155° C., and then heat-set at 235° C. for 30 seconds to give a biaxially oriented laminated polyester film having a thickness of 62 μm.

The above-obtained biaxially oriented laminated polyester film had a Young's modulus of 600 kg/mm² both in the longitudinal and transverse directions, each of the surface layers had a thickness of 2 μm, and the core layer had a thickness of 58 μm. This biaxially oriented laminated polyester film is useful as a base film for forming a flexible disc.

The two surface layers were formed of PEN-2,6 copolymer, and the void to particle ratio of voids formed around the fine silica particles contained in the surface layers was as small as 1.02.

COMPARATIVE EXAMPLE 3

A polyethylene-2,6-naphthalenedicarboxylate containing 0.15% by weight of fine silica particles having an average particle diameter of 0.3 μm was prepared by a conventional method.

Then, Example 4 was repeated except that the PEN-2,6 copolymer was replaced with the above polyethylene-2,6-naphthalenedicarboxylate, to obtain a biaxially oriented laminated polyester film. The void to particle ratio of voids formed around the fine silica particles was as large as 1.7.

EXAMPLES 5–6 AND COMPARATIVE EXAMPLE 4

A polyethylene-2,6-naphthalenedicarboxylate containing 0.2% by weight of fine silica particles having an average particle diameter of 0.1 μm was prepared by a conventional method. Further, polyethylene-2,6-naphthalenedicarboxylate copolymers containing 1.0% by weight of fine silica particles having an average particle diameter of 0.3 μm and containing a component shown in Table 2 in amounts shown in Table 2 were prepared by a conventional method. These polymers had an intrinsic viscosity of 0.65 dl/g.

The above polyethylene-2,6-naphthalenedicarboxylate and one of the above polyethylene-2,6-naphthalenedicarboxylate copolymers were dried, melted in different melt-extrusion apparatus, converged in an extrusion die having a two-layered structure, extruded and cooled to give an unstretched laminated sheet.

The above unstretched laminated sheet was stretched in the longitudinal direction at a stretch ratio of 4.85 through two rolls having different rotation velocities at a temperature of 125° C., further stretched in the transverse direction at a stretch ratio of 5.15 with a tenter at 125° C., and then heat-treated at 215° C. for 10 seconds.

In the above manner, biaxially oriented laminated polyester films having a thickness of 5.4 μm were prepared, and taken up. Table 2 shows the properties of these films.

The same magnetic coating composition as that used in Example 1(2) was applied to the polyethylene-2,6-naphthalenedicarboxylate copolymer film surface of each of the above biaxially oriented laminated polyester films with a reverse coater such that the coatings had a thickness of 3 μm, and the coatings were orientation-treated in a direct current magnetic field at 2,500 Gauss and dried under heat at 100° C. Then, the films were subjected to super calendering treatment (linear pressure 200 kg/cm, temperature 80° C.), and then taken up.

The so-obtained rolls were allowed to stand in an oven at 55° C. for 3 days.

The same back-coating composition as that used in Example 1(2) was applied to the running surface of each of the above biaxially oriented laminated polyester films such that the coating had a thickness of 1 μm, and dried. The resultant films were cut to a width of ½ inch to give magnetic tapes.

Table 2 shows the properties of the above-obtained films and tapes.

Table 2 clearly shows that the magnetic tapes obtained in Examples 5 and 6 were excellent in all of dropout, electromagnetic conversion characteristics, running durability and skew.

PEN-2,6 and BPA-4/PEN-2,6 copolymer was dried, melted in different melt-extrusion apparatus, converged in an extrusion die having a three-layered structure so as to form a core layer of the PEN-2,6 and two surface layers of the PEN-2,6 copolymer, extruded and rapidly cooled to give unstretched laminated sheets.

The above unstretched laminated sheets were stretched in the longitudinal direction at a stretch ratio of 3.5 at 140° C., further stretched in the transverse direction at a stretch ratio of 3.6 at 150° C., and then heat-set at 235° C. for 30 seconds to give biaxially oriented laminated polyester films having a thickness of 62 μm. These biaxially oriented laminated polyester films had a Young's modulus of 630 kg/mm$^2$ both in the

TABLE 2

| | Polymer | Thickness (μm) | Additives (1) particle diameter (2) amount | Surface roughness (nm) |
|---|---|---|---|---|
| Ex. 5 | Polyethylene-2,6-naphthalate | 4.9 | (1) 0.1 μm (2) 0.2% | 5 |
| | Polyethylene-2,6-naphthalene co-polymer containing 3 mol % of 4,4'-diphenyldicarboxylic acid component | 0.5 | (1) 0.3 μm (2) 1.0% | 17 |
| Comp. Ex. 4 | Polyethylene-2,6-naphthalate | 4.9 | (1) 0.1 μm (2) 0.2% | 5 |
| | Polyethylene-2,6-naphthalate | 0.5 | (1) 0.3 μm (2) 1.0% | 17 |
| Ex. 6 | Polyethylene-2,6-naphthalate | 4.9 | (1) 0.1 μm (2) 0.2% | 7 |
| | Polyethylene-2,6-naphthalate co-polymer containing 2.5 mol % of BPA-4* | 0.5 | (1) 0.3 μm (2) 1.0% | 19 |

| | Young's modulus (MD/TD) (kg/mm$^2$) | Heat shrinkage (MD/TD) (%) | Abrasion resistance width of adhering white dust (mm) | Electromagnetic conversion characteristics Y-S/N (dB) | Running durability | Skew (μsec) | Drop-out (counts/min.) |
|---|---|---|---|---|---|---|---|
| Ex. 5 | 710/730 | 0.05/0.08 | 0.6 | +0.5 | excellent | 6 | 5 |
| Comp. Ex. 4 | 700/730 | 0.06/0.08 | 1.2 | 0 | excellent | 7 | 20 |
| Ex. 6 | 700/730 | 0.06/0.08 | 0.7 | +0.5 | excellent | 7 | 7 |

*BPA-4: Ethylene oxide adduct of 2,2-bis(4-hydroxyphenyl)propane (n + m = 4)

EXAMPLES 7–8 AND COMPARATIVE EXAMPLE 5

A polyethylene-2,6-naphthalenedicarboxylate (PEN-2,6) containing 0.15% by weight of fine silica particles having an average particle diameter of 0.3 μm was prepared by a conventional method. A polyethylene-2,6-naphthalenedicarboxylate copolymer (4,4'-D/PEN-2,6 copolymer) containing 0.15% by weight of fine silica particles having an average particle diameter of 0.3 μm and containing 5 mol % of a 4,4'-diphenyldicarboxylic acid component was obtained by a conventional method. Further, a polyethylene-2,6-naphthalenedicarboxylate copolymer (BPA-4/PEN-2,6 copolymer) containing 0.15% by weight of fine silica particles having an average particle diameter of 0.3 μm and containing a component from 3 mol % of a an adduct of 4 mol of ethylene oxide with 2,2-bis(4-hydroxyphenyl)propane was obtained by a conventional method. These polymers had an intrinsic viscosity of 0.65 dl/g.

A combination of the above PEN-2,6 and 4,4'-D/PEN-2,6 copolymer or a combination of the above longitudinal and transverse directions, each of two surface layers of each laminated polyester film had a thickness of 1 μm, and the core layers had a thickness of 60 μm. These biaxially oriented laminated polyester films are useful as a base film for forming a flexible disc.

In each of the biaxially oriented laminated polyester film whose surface layers were formed from the 4,4'-D/PEN-2,6 copolymer (Example 7) and the biaxially oriented laminated polyester film whose surface layers were formed of the BPA-4/PEN-2,6 copolymer (Example 8), the void to particle ratio of voids formed around the fine silica particles contained in the surface layers was as small as 1.03.

On the other hand, a biaxially oriented laminated polyester film was obtained in the same manner as in Examples 7 and 8 except that the 4,4'-D/PEN-2,6 copolymer or the BPA-4/PEN-2,6 copolymer was replaced with the PEN-2,6 (Comparative Example 5). The void to particle ratio of voids formed around the fine silica particles contained in this film was as large as 1.5.

What is claimed is:

1. A laminated polyester film for use in a magnetic recording medium, which comprises:
   (A) a first layer of a first polyester which contains at least 95 mol %, based on the total content of its dicarboxylic acid components, of a 2,6-naphthalenedicarboxylic acid component and whose main recurring unit is composed of ethylene-2,6-naphthalenedicarboxylate, and
   (B) a second layer of a second polyester different from said first polyester and comprising a copolymer containing 93 to 99 mol %, based on the total content of its recurring units, of an ethylene-2,6-naphthalenedicarboxylate recurring unit and 1 to 7 mol % of a second recurring unit containing a dicarboxylic acid component,
   the second layer being laminated on at least one surface of the above first layer.

2. The laminated polyester film of claim 1, wherein the first polyester is a homopolymer of ethylene-2,6-naphthalenedicarboxylate.

3. The laminated polyester film of claim 1, wherein the second polyester contains 1 to 7 mol % of a recurring unit formed from at least one component selected from the group consisting of a 4,4'-diphenyldicarboxylic acid component, a 2,7-naphthalenedicarboxylic acid component and an ethylene oxide adduct of 2,2-bis(4-hydroxyphenyl)propane.

4. The laminated polyester film of claim 1, which has a total thickness of 3 to 80 $\mu$m.

5. The laminated polyester film of claim 4 in the form of a tape, which has a total thickness of 3 to 12 $\mu$m and has a Young's modulus of at least 650 kg/mm$^2$ in at least one of longitudinal and transverse directions.

6. The laminated polyester film of claim 5, wherein the second layer has a thickness of at least 0.1 $\mu$m and the thickness of the second layer does not exceed $\frac{1}{2}$ of the total film thickness.

7. The laminated polyester film of claim 4 in the form of a disc, which has a total thickness of 30 to 80 $\mu$m and has a Young's modulus of at least 500 kg/mm$^2$ in any one direction.

8. The laminated polyester film of claim 7, wherein the second layer has a thickness of 0.2 to 10 $\mu$m.

9. The laminated polyester film of claim 1, wherein the second layer is laminated on both surfaces of the first layer.

10. The laminated polyester film of claim 1, wherein the second layer is laminated on only one surface of the first layer.

11. A magnetic recording medium comprising the laminated polyester film of claim 1 as a base film and a magnetic layer, the laminated polyester film comprising said first layer and two second layers, one of the second layers being laminated on one surface of the first layer and the other second layer being laminated on the other surface, and the magnetic layer being present on the outermost surface of at least one of the above two second layers 12. A magnetic recording medium comprising the laminated polyester film of claim 1 as a base film and a magnetic layer, the laminated polyester film comprising said first layer and said second layer laminated on only one surface of the first layer, the magnetic layer being present on the other surface of the first layer.

13. The laminated polyester film of claim 1 wherein the (B) second layer of the second polyester comprises a copolymer containing 93 to 99 mol %, based on the total content of its recurring units, of ethylene-2,6-naphthalenedicarboxylate recurring unit, and 1 to 7 mol % of a recurring unit formed from at least one component selected from the group consisting of a 4,4'-diphenyldicarboxylic acid component, a 2,7-naphthalenedicarboxylic acid component and an ethylene oxide adduct of 2,2-bis(4-hydroxy)propane component.

14. A laminated polyester film for use in a magnetic recording medium, which comprises:
   (A) a first layer of a first polyester consisting essentially of a homopolymer of an ethylene-2,6-naphthalenedicarboxylate, and
   (B) a second layer of a second polyester different from said first polyester and consisting essentially of a copolymer containing 93 to 99 mol %, based on the total content of its recurring units, of an ethylene-2,6-naphthalenedicarboxylate recurring unit and 1 to 7 mol % of a second recurring unit containing a dicarboxylic acid component,
   the second layer being laminated on at least one surface of the above first layer.

15. The laminated polyester film of claim 14 in the form of a tape wherein the second layer of the film has a thickness of at least 0.1 $\mu$m and does not exceed $\frac{1}{2}$ the total film thickness and wherein the film has a total thickness of 3 to 12 $\mu$m and a Young's modulus of at least 650 kg/mm$^2$ in at least one of longitudinal and transverse directions.

16. The laminated polyester film of claim 15 wherein the (B) second layer of the second polyester comprises a copolymer containing 93 to 99 mol %, based on the total content of its recurring units, of ethylene-2,6-naphthalenedicarboxylate recurring unit, and 1 to 7 mol % of a recurring unit formed from at least one component selected from the group consisting of a 4,4'-diphenyldicarboxylic acid component, a 2,7-naphthalenedicarboxylic acid component and an ethylene oxide adduct of 2,2-bis(4-hydroxy)propane component.

17. The laminated polyester film of claim 14 in the form of a disc wherein the second layer of the film has a thickness of 0.2 to 10 $\mu$m and wherein the film has a total thickness of 30 to 80 $\mu$m and a Young's modulus of at least 500 kg/mm$^2$ in any one direction.

18. The laminated polyester film of claim 17 wherein the (B) second layer of the second polyester comprises a copolymer containing 93 to 99 mol %, based on the total content of its recurring units, of ethylene-2,6-naphthalenedicarboxylate recurring unit, and 1 to 7 mol % of a recurring unit formed from at least one component selected from the group consisting of a 4,4'-diphenyldicarboxylic acid component, a 2,7-naphthalenedicarboxylic acid component and an ethylene oxide adduct of 2,2-bis(4-hydroxy)propane component.

19. The laminated polyester film of claim 14, wherein the second layer is laminated on both surfaces of the first layer.

20. The laminated polyester film of claim 14, wherein the second layer is laminated on only one surface of the first layer.

21. A laminated polyester film magnetic recording medium, which comprises:
   (A) a first layer of a first polyester consisting essentially of a homopolymer of ethylene-2,6-naphthalenedicarboxylate, and
   (B) a second layer of a second polyester different from said first polyester and comprising a copolymer containing 93 to 99 mol %, based on the total content of its recurring units, of an ethylene-2,6- naphthalenedicarboxylate recurring unit, and 1 to 7 mol % of a recurring unit formed from at least one component selected from the group consisting of a 4,4'-diphenyldicarboxylic acid component, a 2,7-naphthalenedicarboxylic acid component and an ethylene oxide adduct of 2,2-bis(4-hydroxyphenyl)-propane component, the second layer being laminated on at least one surface of the above first layer.

22. The laminated polyester film of claim 21 in the form of a tape wherein the second layer of the film has a thickness of at least 0.1 μm and does not exceed ½ the total film thickness and wherein the film has a total thickness of 3 to 12 μm and a Young's modulus of at least 650 kg/mm$^2$ in at least one of longitudinal and transverse directions.

23. The laminated polyester film of claim 21 in the form of a disc wherein the second layer of the film has a thickness of 0.2 to 10 μm and wherein the film has a total thickness of 30 to 80 μm and a Young's modulus of at least 500 kg/mm$^2$ in any one direction.

24. A magnetic recording medium comprising the laminated polyester film of claim 21 as a base film and a magnetic layer, the laminated polyester film comprising said first layer and two second layers, one of the second layers being laminated on one surface of the first layer and the other second layer being laminated on the other surface, and the magnetic layer being present on the outermost surface of at least one of the above two second layers.

25. A magnetic recording medium comprising the laminated polyester film of claim 21 as a base film and a magnetic layer, the laminated polyester film comprising said first layer and said second layer laminated on only one surface of the first layer, the magnetic layer being present on the other surface of the first layer.

* * * * *